(12) United States Patent
Jung et al.

(10) Patent No.: US 11,115,862 B2
(45) Date of Patent: Sep. 7, 2021

(54) METHOD AND APPARATUS FOR STEERING TRAFFIC BETWEEN CELLULAR NETWORK AND WIRELESS LOCAL AREA NETWORK (LAN) NETWORK IN MOBILE COMMUNICATION SYSTEM

(71) Applicant: Samsung Electronics Co., Ltd., Suwon-si (KR)

(72) Inventors: Hakyung Jung, Seoul (KR); Jinsung Lee, Seoul (KR); Jungshin Park, Seoul (KR); Hanna Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/384,661

(22) Filed: Apr. 15, 2019

(65) Prior Publication Data
US 2019/0246316 A1    Aug. 8, 2019

Related U.S. Application Data

(63) Continuation of application No. 15/301,373, filed as application No. PCT/KR2015/003311 on Apr. 2, 2015, now Pat. No. 10,306,514.

(30) Foreign Application Priority Data

Apr. 2, 2014    (KR) .......................... 10-2014-0039371

(51) Int. Cl.
*H04W 28/08* (2009.01)
*H04B 17/318* (2015.01)
(Continued)

(52) U.S. Cl.
CPC .......... *H04W 28/08* (2013.01); *H04B 17/318* (2015.01); *H04W 24/08* (2013.01);
(Continued)

(58) Field of Classification Search
CPC ............. H04W 28/0268; H04W 80/02; H04W 72/042; H04W 76/10; H04W 76/15; H04W 28/0263
See application file for complete search history.

(56) References Cited

U.S. PATENT DOCUMENTS

| 2011/0045834 A1 | 2/2011 | Kim et al. |
| 2011/0075557 A1 | 3/2011 | Chowdhury et al. |

(Continued)

FOREIGN PATENT DOCUMENTS

| CN | 101730150 A | 6/2010 |
| CN | 102273263 A | 12/2011 |

(Continued)

OTHER PUBLICATIONS

International Search Report dated Jun. 30, 2015 in connection with International Patent Application No. PCT/KR2015/003311, 13 pages.

(Continued)

*Primary Examiner* — Kwasi Karikari

(57) ABSTRACT

The present disclosure relates to a 5G or pre-5G communication system to be provided for supporting a higher data transmission rate beyond 4G communication systems such as LTE. More specifically, a method for transmitting and receiving signals by a base station of a mobile communication system according to one embodiment of the present specification comprises: a step of determining whether to steer a traffic related to a terminal to a wireless LAN; a step for determining a traffic to be steered to the wireless LAN; a step for transmitting, to the terminal, a first message including information for an uplink transmission of the traffic to be steered; and a step for transmitting, to a gateway, a second message including information for a downlink transmission of the traffic to be steered. According to an embodiment of the present specification, in a network and a terminal using both a cellular and a wireless LAN, presented (Continued)

is a method for transferring, via an access network considering the signal strength between the terminal and each access network, a load condition of each access network, a policy of a provider etc., traffic which are sent and received by the terminal and the network.

4 Claims, 18 Drawing Sheets

(51) Int. Cl.
  *H04W 24/08* (2009.01)
  *H04W 48/06* (2009.01)
  *H04W 88/16* (2009.01)
  *H04W 84/12* (2009.01)

(52) U.S. Cl.
  CPC ............ *H04W 48/06* (2013.01); *H04W 84/12* (2013.01); *H04W 88/16* (2013.01)

(56) References Cited

U.S. PATENT DOCUMENTS

| | | | |
|---|---|---|---|
| 2011/0317560 A1 | 12/2011 | Aramoto et al. | |
| 2012/0039304 A1 | 2/2012 | Kim et al. | |
| 2012/0120828 A1* | 5/2012 | Anderson | H04W 52/0225 370/252 |
| 2012/0218897 A1* | 8/2012 | Aramoto | H04W 36/0027 370/235 |
| 2013/0322238 A1 | 12/2013 | Sirotkin | |
| 2014/0003239 A1 | 1/2014 | Etemad et al. | |
| 2014/0016614 A1* | 1/2014 | Velev | H04W 36/165 370/331 |
| 2014/0056243 A1* | 2/2014 | Pelletier | H04W 72/1268 370/329 |
| 2014/0086211 A1 | 3/2014 | Liu | |
| 2014/0098789 A1 | 4/2014 | Liu et al. | |
| 2014/0177448 A1 | 6/2014 | Wu et al. | |
| 2014/0241297 A1* | 8/2014 | Park | H04W 74/0833 370/329 |
| 2014/0334293 A1 | 11/2014 | Narasimha et al. | |
| 2014/0334446 A1 | 11/2014 | Lim et al. | |
| 2014/0341038 A1 | 11/2014 | Lim | |
| 2015/0085759 A1* | 3/2015 | Gajula | H04W 72/02 370/329 |

FOREIGN PATENT DOCUMENTS

| | | |
|---|---|---|
| CN | 102821483 A | 12/2012 |
| CN | 102918922 A | 2/2013 |
| CN | 102958108 A | 3/2013 |
| CN | 103686883 A | 3/2014 |
| KR | 10-2010-0120259 A | 11/2010 |
| WO | 2011038352 A1 | 3/2011 |
| WO | 2013024054 A1 | 2/2013 |
| WO | 2013042330 A1 | 3/2013 |
| WO | 2013089414 A1 | 6/2013 |
| WO | 2013100629 A1 | 7/2013 |
| WO | 2014008039 A1 | 1/2014 |
| WO | 2014035619 A1 | 3/2014 |

OTHER PUBLICATIONS

Written Opinion of the International Searching Authority dated Jun. 30, 2015 in connection with International Patent Application No. PCT/KR2015/003311, 6 pages.
Extended European Search Report for European Application No. 15772744.7, dated Oct. 18, 2017, 10 pages.
Interdigital Communications, "Use case for UE based and network based traffic offload based on user plane congestion in the RAN," 3GPP TSG-SA WG1 #59, S1-122403 rev of S1-122172, Chicago, USA, Jul. 30-Aug. 3, 2012, 4 pages.
China National Intellectual Property Administration, "The First Office Action," Application No. CN 201580017521.0, dated Feb. 15, 2019, 28 pages.
European Patent Office, "Communication pursuant to Article 94(3) EPC," Application No. EP15772744.7, dated Mar. 5, 2019, 7 pages.

* cited by examiner

FIG. 4

| PDN Type | Example Services | WLAN Preference |
|---|---|---|
| Internet PDN | TCP-based (e.g., www, E-mail, chat, ftp, p2p file sharing, progressive video, etc.) | 200 |
| Operator PDN | Rich Communications Services | 50 |
| IMS PDN | VoLTE | 0 |

FIG. 5

| QCI | Resource Type | Example Services | WLAN Preference |
|---|---|---|---|
| 1 | GBR | Conversational Voice | 10 |
| 2 | | Conversational Video (Live Streaming) | 30 |
| 3 | | Real Time Gaming | 50 |
| 4 | | Non-Conversational Video (Buffered Streaming) | 50 |
| 5 | Non-GBR | IMS Signalling | 0 |
| 6 | | Video (Buffered Streaming) TCP-based (e.g., www, E-mail, chat, ftp, p2p file sharing, progressive video, etc.) | 100 |
| 7 | | Voice Video (Live Streaming, Interactive Gaming) | 100 |
| 8 | | Video (Buffered Streaming) TCP-based (e.g., www, E-mail, chat, ftp, p2p file sharing, progressive video, etc.) | 0 |
| 9 | | | 0 |

FIG. 6

| Flow Type | UE Location | TimeOfDay | WLAN Preference |
|---|---|---|---|
| [*, UE IP, SIP, *, UDP] | * | * | 0 |
| [*, UE IP, P2P, *, *] | * | * | 255 |
| [*, UE IP, Video, *, UDP] | * | * | 20 |
| [*, UE IP, Game, *, *] | Gangnam station | 11:00-14:00 | 30 |
| | | | 40 |
| [*, UE IP, *, *, *] | * | * | 10 |

602 — Flow Type
604 — UE Location
606 — TimeOfDay
608 — WLAN Preference

METHOD AND APPARATUS FOR STEERING TRAFFIC BETWEEN CELLULAR NETWORK AND WIRELESS LOCAL AREA NETWORK (LAN) NETWORK IN MOBILE COMMUNICATION SYSTEM

CROSS-REFERENCE TO RELATED APPLICATIONS

This application is a continuation of Ser. No. 15/301,373, which is the National Stage of International Application No. PCT/KR2015/003311, filed Apr. 2, 2015, which claims priority to Korean Patent Application No. 10-2014-0039371, filed Apr. 2, 2014, the disclosures of which are herein incorporated by reference in their entirety.

BACKGROUND

1. Field

Embodiments of the present disclosure relate to a method and apparatus for setting a traffic path in a wireless communication network. More particularly, in a terminal which accesses a network through a cellular base station and a wireless LAN (WLAN), embodiments relate to an apparatus and method for steering all or part of traffic, exchanged between the terminal and the network, from the cellular to the WLAN or vice versa.

2. Description of Related Art

In order to satisfy increasing demands of radio data traffic after the commercialization of a 4G communication system, much effort is made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, the 5G communication system considers implementation at a super-high frequency (mmWave) band (e.g., such as a 60 GHz band). In order to obviate a path loss of a radio wave and to increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like. Besides, in the 5G communication system, a hybrid FSK and QAM modulation (FQAM) and a sliding window super-position coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

In addition, according to the explosive growth of mobile traffic, a WLAN network that can be constructed at a low cost by using an unlicensed band is being reviewed as a strong offloading solution of a cellular operator which reaches the limit in handling traffic with only a cellular network. Most cellular operators construct a WLAN network themselves or cooperate with the existing WLAN operators and, if cellular base stations are incapable of handling subscribers' traffic in a crowded area, induce subscribers to be served through a wireless LAN access point.

The 3GPP standard adopts a structure in which both the cellular network and the WLAN access network are inter-worked at a gateway (PDN-GW) of a cellular core network such that a terminal can be continually served even in case of handover between the cellular network and the WLAN network. In this structure, even though handover is made between the cellular network and the WLAN, the terminal may not suffer disconnection of a service by maintaining the same IP address.

Therefore, a method and apparatus for selecting a transfer path of traffic for effectively delivering traffic in this system and thereby determining a traffic path are needed.

SUMMARY

Embodiments of the present disclosure are proposed to solve the above-discussed problems and have an object of providing an effective traffic steering method and apparatus for a terminal that transmits and receives data to and from a network through a cellular base station and a WLAN. Another object is to provide a method and apparatus for adjusting a network load by steering traffic, being offered through either a cellular network or a WLAN network, to the other network.

In order to accomplish the above objects, a method for transmitting and receiving a signal at a base station in a mobile communication system according to an embodiment of this disclosure comprises steps of: determining whether to steer a traffic related to a terminal to a wireless LAN (WLAN); determining the traffic to be steered to the WLAN; transmitting, to the terminal, a first message comprising information on uplink transmission of the traffic to be steered; and transmitting, to a gateway, a second message comprising information on downlink transmission of the traffic to be steered.

A method for transmitting and receiving a signal at a terminal in a mobile communication system according to another embodiment of this disclosure comprising steps of: transmitting and receiving a traffic to and from at least one of a base station and a wireless LAN (WLAN); receiving, from the base station, a first message comprising information on steering a part of the traffic; and steering the traffic, based on the first message.

A base station in a mobile communication system according to another embodiment of this disclosure comprises a transceiver unit configured to transmit or receive a signal; and a controller configured to determine whether to steer a traffic related to a terminal to a wireless LAN (WLAN), and to determine the traffic to be steered to the WLAN, wherein the controller is further configured to control the transceiver unit to transmit, to the terminal, a first message comprising information on uplink transmission of the traffic to be steered, and to transmit, to a gateway, a second message comprising information on downlink transmission of the traffic to be steered.

A terminal in a mobile communication system according to still another embodiment of this disclosure comprises a transceiver unit configured to transmit or receive a signal; and a controller configured to control the transceiver unit to transmit and receive a traffic to and from at least one of a base station and a wireless LAN (WLAN), to receive, from the base station, a first message comprising information on steering a part of the traffic, and to steer the traffic, based on the first message.

According to embodiments of the present disclosure, proposed is a method for delivering traffic, exchanged between a network and a terminal using both a cellular and a WLAN, through an access network in view of signal strength between the terminal and each access, a load condition of each access network, an operator's policy, and the like. Also, according to embodiments of this disclosure, a user of the terminal can use the optimal access network proposed by the network and thereby keep the best user experience without undergoing any network congestion. And also, according to embodiments of this disclosure, a network operator can minimize a network operating cost by properly distributing traffic on the basis of one of a load condition of the access network and a policy thereof.

BRIEF DESCRIPTION OF THE DRAWINGS

FIG. 4 illustrates a parameter for setting a WLAN preference of a bearer according to an embodiment of the present disclosure.

FIG. 5 illustrates another parameter for setting a WLAN preference of a bearer according to an embodiment of the present disclosure.

FIG. 6 illustrates still another parameter for setting a WLAN preference of a bearer according to an embodiment of the present disclosure.

DETAILED DESCRIPTION

Figure 1:
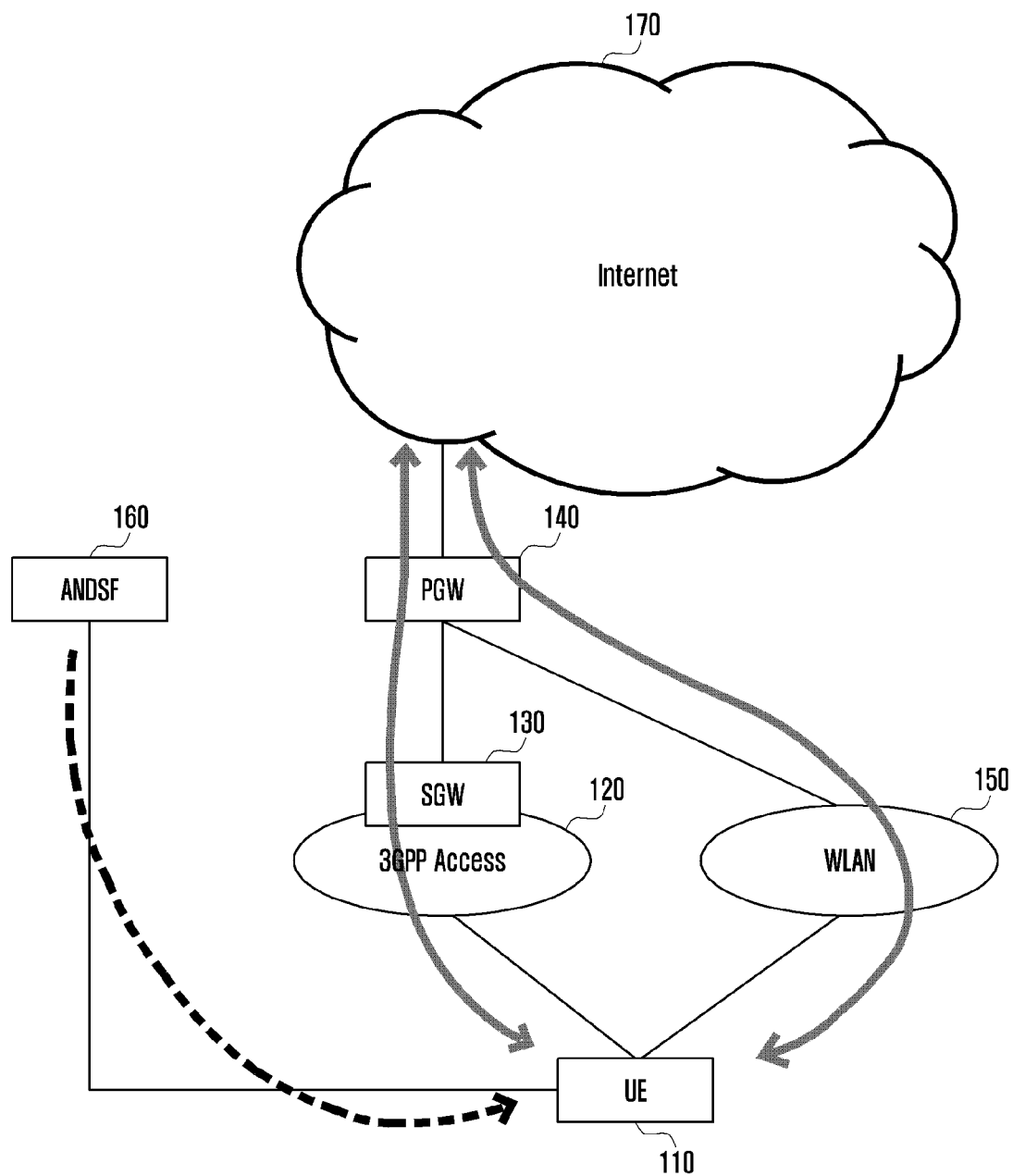
FIG. 1 is a diagram illustrating a network structure according to an embodiment of the present disclosure.

Hereinafter, embodiments of the present invention will be described with reference to the accompanying drawings.

In this disclosure, some techniques or elements, which are well known in the art or irrelevant to disclosed embodiments, may not be described or illustrated in detail. This is to avoid obscuring the subject matter of the present disclosure.

For similar reasons, the drawings are not necessarily to scale and certain features may be exaggerated or omitted in order to better illustrate and explain the present disclosure. Through the drawings, the same or similar reference numerals denote corresponding features consistently.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention. Accordingly, it should be apparent to those skilled in the art that this description is provided for illustration purpose only and not for the purpose of limiting the present invention as defined by the appended claims and their equivalents.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, embodiments of the present disclosure will be described with reference to the accompanying drawings. In this disclosure, well known functions or structures may not be described or illustrated in detail to avoid obscuring the subject matter of the present invention.

An embodiment of the present disclosure relates to an apparatus and method for steering, from a cellular to a WLAN or vice versa, all or part of traffic transmitted under the control of a network in a communication between the network and a terminal using both the cellular and the WLAN.

An embodiment of this disclosure may include technical features as follows.

(1) Bearer setting in view of WLAN preference for each traffic

In a traffic steering method according to an embodiment of this disclosure, a cellular base station (or referred to as a base station) may determine whether to steer traffic and also determine a steering direction. Specifically, the base station can know best a resource condition of a real-time radio access and thus make a decision related to a radio access.

However, the base station may not distinguish a PDN or a flow and instead allow identifying in a bearer unit. Specifically, in an embodiment, the base station may perform a control in a bearer unit, not in a flow unit, in connection with traffic being transmitted.

Disclosed in an embodiment of this disclosure is a method for determining a WLAN preference of traffic by considering one or more of the location of a terminal that receives traffic from a gateway, a PDN that transmits traffic, QCI corresponding to traffic, and a flow type of traffic, and then delivering traffic having WLAN preference values being equal, similar, or within a specific range by means of a single bearer. In an embodiment, a WLAN preference that determines priority for transmission to WLAN of traffic contained in a bearer may have a value within a specific range, e.g., from 0 to 255. In an embodiment, the base station may determine traffic to be steered preferentially on the basis of such a WLAN preference value.

(2) Check traffic capability of WLAN

When the terminal transmits and receives data through the WLAN, the terminal needs to be offered QoS being similar in level to that offered through the cellular. In this case, the cellular base station and the WLAN AP are required to exchange information about which level of traffic is desired or can be delivered.

For the above, disclosed in an embodiment is a procedure in which the cellular base station checks, through the terminal, whether the WLAN AP can accept traffic to be steered by the cellular. Specifically, the terminal may request information related to a transmission capacity of the WLAN AP at the request of the base station. Also, the terminal may deliver transmission capacity information, received from the WLAN AP, to the base station.

(3) QoS monitoring of bearer transferred to WLAN

Normally the WLAN using an unlicensed band has always a possibility of QoS degradation due to external interference or the like. Therefore, an embodiment of this disclosure includes a method for returning traffic to the cellular in case traffic transmitted via the WLAN has degraded QoS. Also, the base station may monitor, through the terminal, QoS of traffic transmitted via the WLAN, and based on a monitoring result, return such traffic to the cellular.

(4) Bearer resetting initiated by cellular base station

In an embodiment of this disclosure, the cellular base station may determine to transfer a specific bearer from the cellular to the WLAN or vice versa in view of a resource condition of a radio access network. For this, an embodiment includes a procedure in which the cellular base station resets a bearer among the terminal, the access network, and the core network gateway.

In an embodiment, the determination of steering traffic from the WLAN to the cellular network or vice versa may be performed by at least one of the base station, the WLAN AP, and a network node. This network node may be at least one of PGW and SGW. Hereafter, an embodiment of this disclosure will be described in detail with reference to drawings.

FIG. 1 is a diagram illustrating a network structure according to an embodiment of the present disclosure.

Referring to FIG. 1, user equipment (UE) 110, also referred as a terminal herein, is connected with a PDN gateway (PGW) 140 through a 3GPP access network 120 including a serving gateway (SGW) 130 or through a wireless LAN (WLAN) 150, and may transmit or receive data to or from an internet 170. A policy and related information on transmission and reception of data between different networks may be received through an access network discovery service function (ANDSF) 160.

In an embodiment, the 3GPP Access network 120 may include a base station (also referred to as evolved nodeB (eNB) herein).

The internet 170 may include a plurality of PDNs, and the PDN and the UE 110 may transmit or receive data to or from each other.

It may be needed to determine whether to transmit traffic, transmitted or received by the UE, through the 3GPP access network 120 or through the WLAN 150. Therefore, in an embodiment, a method and apparatus for transferring specific traffic on the basis of such determination are disclosed.

Additionally, in an embodiment, the WLAN 150 may be connected with the 3GPP access network 120.

In an embodiment, the WLAN 150 may be directly connected with the 3GPP access network 120. For example, the WLAN 150 operated by an operator of the 3GPP access network 120 may be directly connected with the 3GPP access network 120.

In another embodiment, the WLAN 150 may be connected with the 3GPP access network 120 through a separate node. This separate node may be a gateway related to security, for example, an evolved packet data gateway (ePDG).

If the WLAN 150 is directly connected with the 3GPP access network 120 as discussed above, the WLAN 150 may receive a signal from the SGW 130. Also, when it is determined to perform traffic steering, the SGW 130 may perform traffic steering toward the 3GPP access network 120 or the WLAN 150.

Figure 2:
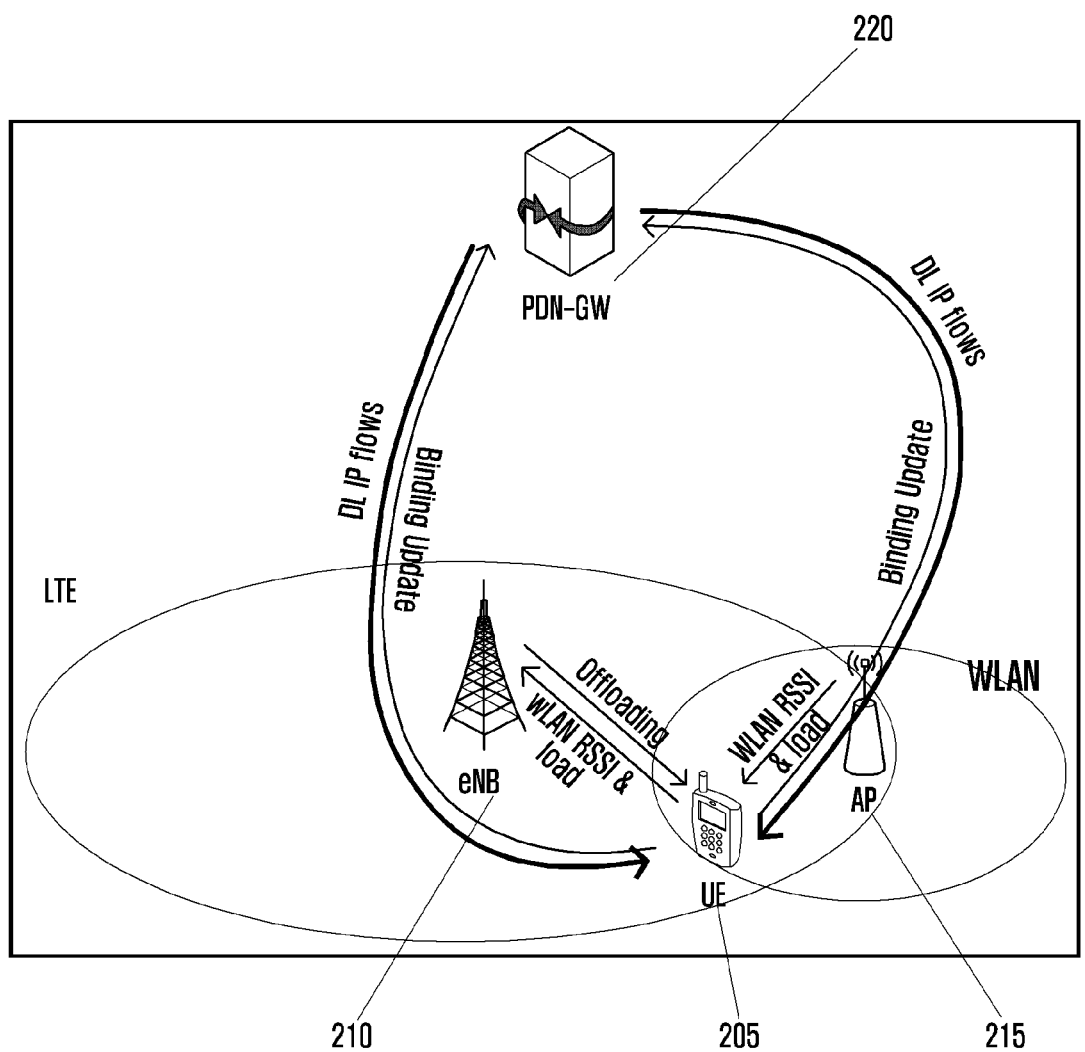
FIG. 2 is a diagram illustrating a structure of a communication system according to an embodiment of the present disclosure.

FIG. 2 is a diagram illustrating a structure of a communication system according to an embodiment of the present disclosure.

Referring to FIG. 2, whether UE 205 transmits and receives data via WLAN 215 generally complies with a rule (or policy) predefined in the UE 205 or a rule received from an ANDSF server. However, if the state of the 3GPP access network (2G/3G or LTE) is considered in case of traffic offloading toward the WLAN 215, or in order to perform a control of traffic offloading more dynamically, a method of commanding at eNB 210 as follows may be used.

Namely, the eNB 210 may command the UE 205 to report the state (signal strength, a congestion status, a connection status, etc.) of the neighboring WLAN 215, collect related information, and then instruct both the UE 205 and the network to offload specific traffic toward the WLAN 215 in consideration for both the collected information and the state of the eNB 205. Also, according to an embodiment, such specific traffic to be offloaded may be determined on the basis of a specific parameter contained in a bearer. And also, in an embodiment, the specific parameter may include a WLAN preference.

Figure 3:
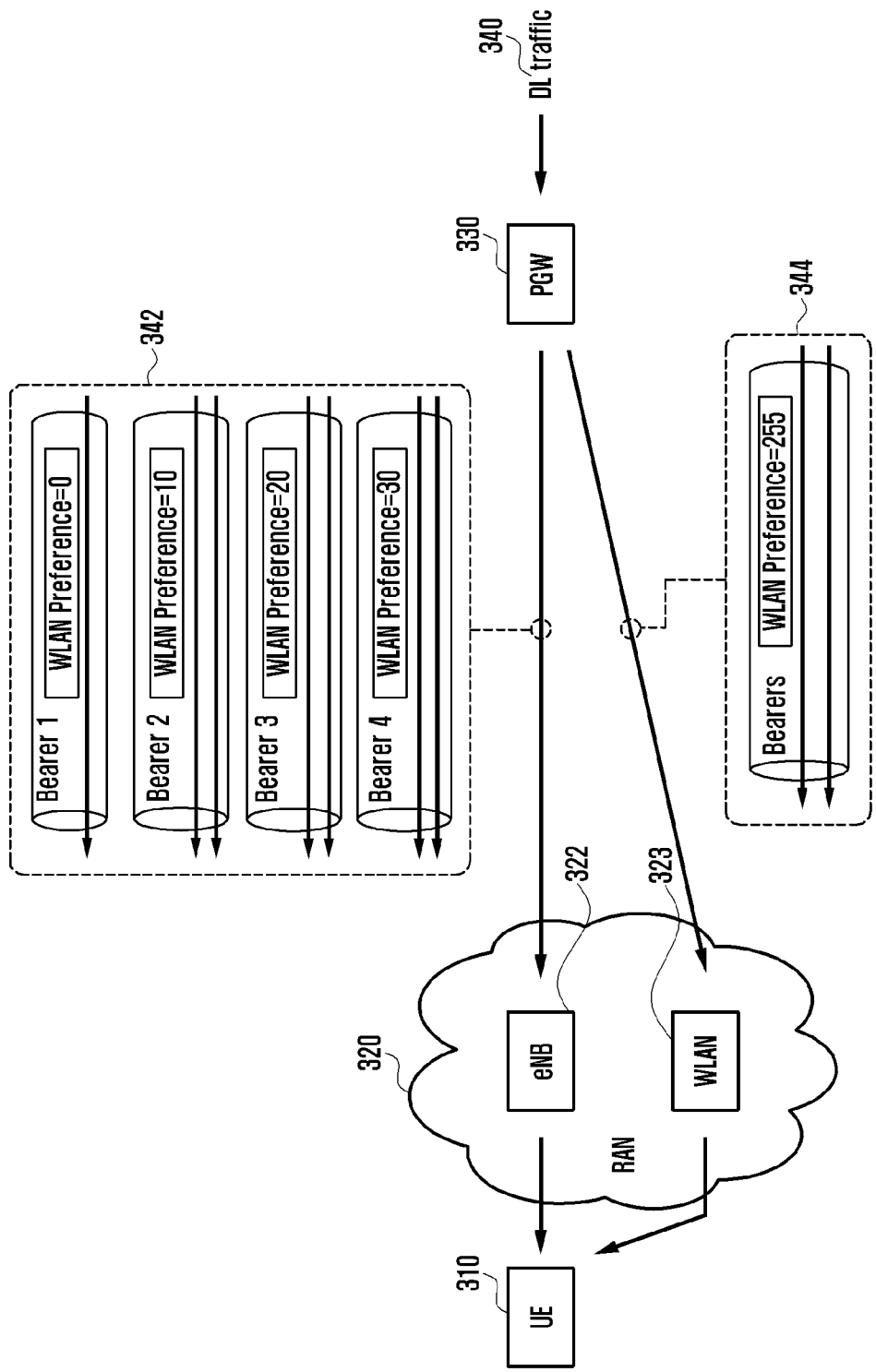
FIG. 3 is a diagram illustrating a method for delivering traffic according to an embodiment of the present disclosure.

FIG. 3 is a diagram illustrating a method for delivering traffic according to an embodiment of the present disclosure.

Referring to FIG. 3, UE 310 may receive downlink traffic 340 from a PGW 330 through a RAN 320. In an embodiment, the RAN may include at least one of eNB 322 and a WLAN 323.

The first traffic 342 transmitted through the eNB 322 may include the first bearer to the fourth bearer. Also, the second traffic 344 transmitted through the WLAN 323 may include the fifth bearer. The number of bearers being transmitted may be varied according to embodiments.

In an embodiment, the UE 310 is attached to an operator's network that simultaneously services both a cellular and a WLAN, and is simultaneously connected with both the eNB (i.e., a cellular base station) 322 and the WLAN AP 323. Additionally, based on the WLAN interworking standard of 3GPP, a network operator connect (anchoring) a 3GPP cellular network and a non-3GPP WLAN at the PGW 330. Additionally, according to an embodiment, in case the WLAN is directly connected with the 3GPP access network, an SGW may connect the 3GPP cellular network and the non-3GPP WLAN.

In an embodiment of this disclosure, the eNB 322 may determine, depending on resource conditions of the access network, whether to continuously serve a specific bearer through the eNB 322 or to serve the bearer after steering toward the WLAN AP 323.

In this process, based on a WLAN preference specified in a bearer, the eNB 322 may determine such a specific bearer to be steered.

In an embodiment, a plurality of bearers may be set between the access network and the gateway of the core network. Each bearer may include a WLAN preference value.

For example, the minimum value (e.g., 0) of a WLAN preference means that an operator does not want to serve such traffic to the WLAN. Therefore, the eNB does not instruct steering toward the WLAN with regard to a bearer having zero as a WLAN preference value. On the contrary, the maximum value (e.g., 255) of a WLAN preference means that an operator wants to serve such traffic to the WLAN if possible. Therefore, if the UE is connected with the WLAN AP, a relevant bearer is always served to the WLAN AP. The above values of a WLAN preference are exemplary only and may have any other range. Additionally, in an embodiment, the eNB 322 may perform traffic steering on the basis of a WLAN preference value. Specifically, traffic having a higher WLAN preference value may be preferentially steered to the WLAN 323.

In an embodiment, a target of dynamic steering based on resource conditions of the access network detected by the eNB 322 may have a certain WLAN preference value which falls between the minimum value and the maximum value. For example, if the UE 310 is simultaneously connected with both the eNB 322 and the WLAN AP 323, and if the eNB 322 has a higher transmission load since traffic of the eNB 322 is greater than that of the WLAN AP 323, the eNB 322 may determine to steer all or part of traffic, transmitted or received to or from the UE 310, toward the WLAN AP 323.

In an embodiment, if the eNB 322 determines to steer part of traffic of the UE 310, the eNB 322 may consider preferentially steering traffic having a high WLAN preference with reference to a WLAN preference value of a bearer. Although in an embodiment the PGW sets a WLAN preference value, any other entity of any other network may set a WLAN preference value.

Meanwhile, an embodiment exemplarily shows a setting state of a bearer at a specific moment. The PGW 330 serves traffic through five bearers in view of PDN, QCI, flow type, and the like, and each bearer has a WLAN preference value. A bearer 1 having a WLAN preference value of 0 (minimum value) is served via the cellular network, and a bearer 5 having a WLAN preference value of 255 (maximum value) is served via the WLAN network.

Meanwhile, in case of bearers 2, 3, and 4 having WLAN preference values between 0 and 255, these bearers are initially set to pass through the cellular network. However, depending on determination of the eNB, these bearers may be dynamically steered between the cellular network and the WLAN network.

In this embodiment, since types of WLAN preference values are smaller in number than the number of creatable bearers, different bearers may be created for all WLAN preference values. However, if types of WLAN preference values are greater in number than the number of creatable bearers, it is possible to match some adjacent WLAN preference values to a single bearer.

FIG. 4 illustrates a parameter for setting a WLAN preference of a bearer according to an embodiment of the present disclosure. Specifically, a parameter used for determining a WLAN preference according to a PDN type in a process of setting a WLAN preference of a bearer at a PGW is included.

Referring to FIG. 4, traffic being transmitted may have a type 402 of PDN connected thereto. Each PDN type 402 has an exemplary service 404, and may have a preset WLAN preference.

In an embodiment, the PDN type may have at least one of an internet PDN, an operator PDN, and an IP multimedia subsystem (IMS).

In an embodiment, the internet PDN may have a TCP-based service, and the WLAN preference of the internet PDN may have a value of 200. However, any WLAN preference value used in this embodiment and following embodiments is an exemplary only and may be set differently depending on implementation.

In an embodiment, the operator PDN may include PDN for a rich communication service, and the WLAN preference of the operator PDN has a value of 50.

In an embodiment, the IMS PDN may include PDN for VoLTE, and the WLAN preference of the IMS PDN has a value of 0. Specifically, in an embodiment, data transmitted or received to or from the IMS PDN is not steered toward the WLAN and instead transmitted or received through the eNB.

In this embodiment, the UE uses three PDN connections in total. In case of the IMS PDN used for a service such as VoLTE, the disconnection of service may happen when the service is performed through a WLAN having smaller cell coverage. Therefore, an operator may set the WLAN preference of a bearer belonging to the IMS PDN at 0.

In case of offering a rich communication service or the like with a separate operator PDN, an operator may set the WLAN preference value at 50 which is slightly higher than that that of VoLTE.

In case of the internet PDN that serves normal internet traffic, an operator may set the WLAN preference value at 200 which is a higher value for promoting the utilization of WLAN.

FIG. 5 illustrates another parameter for setting a WLAN preference of a bearer according to an embodiment of the present disclosure. Specifically, this shows an example of referring to QCI of a bearer when the PGW sets a WLAN preference of a bearer.

Referring to FIG. 5, traffic being transmitted may have QCI 502. Each QCI may have a resource type 504 and include an exemplary service 506. Therefore, each QCI may have a WLAN preference value 508.

In an embodiment, the QCI 502 may have values of 1 to 9. Therefore, the resource type 504 may include a guaranteed bit rate (GBR) and a non-GBR.

Additionally, each QCI 502 may include the exemplary service 506.

Like this embodiment, 3GPP defines nine types of QCIs. In an embodiment, in case of QCIs 5, 8, and 9 which mainly carry a service, such as IMS Signaling or default bearer, requiring a seamless connection, an operator may set the WLAN preference at a value of 0 so as to be always serviced through the cellular network. Additionally, in case of QCIs 1, 2, 3, and 4 which have the resource type of GBR, an operator may set the WLAN preference at a lower value between 10 and 50 in view of the characteristics of the WLAN incapable of strict QoS guarantee due to external interference or the like.

Meanwhile, in case of QCIs 6 and 7 having the resource type of non-GBR and having certain tolerance of QoS degradation, an operator may set the WLAN preference at a relatively higher value.

As discussed heretofore in an embodiment, the PGW may set the WLAN preference on the basis of a QCI value.

FIG. 6 illustrates still another parameter for setting a WLAN preference of a bearer according to an embodiment of the present disclosure.

Referring to FIG. 6, in an embodiment, the PGW may determine a WLAN preference 608, based on at least one of a flow type 602 of traffic being transmitted, a UE location 604, and a time of day 606.

In an embodiment, the PGW may set the WLAN preference of a bearer on the basis of the type of an IP flow type.

In an embodiment, the flow type 602 is 5-Tuple formed of a source IP address, a destination IP address, a source port number, a destination port number, and a protocol identifier. In an embodiment, the PGW may determine the WLAN preference on the basis of at least one of pieces of information contained in the flow type 602. Specifically, through such information, an IP flow to which the WLAN preference will be assigned may be distinguished from the others.

For example, with regard to SIP traffic filtered with (*, UE IP, SIP, *, UDP), an operator may set the WLAN preference at a value of 0 to be always serviced via the cellular. Additionally, with regard to P2P traffic filtered with (*, UE IP, P2P, *, *), the WLAN preference may be set at a value of 255 to be always serviced via the WLAN.

In an embodiment, UE IP, SIP, P2P, etc. used in the above 5-Tuple are merely convenient marks for easy understanding. Actually, real port numbers used in applications of UE IP, SIP and P2P may be used instead and, based on one or more of them, the WLAN preference may be determined.

Meanwhile, even regarding the same IP flows, an operator may appoint different WLAN preferences on the basis of at least one of the UE location and the time of day.

In an embodiment, the UE location 604 allows different policies to be carried out depending on the location of UE. For example, an IP flow filtered with (*, UE IP, *, *, *) may have different WLAN preferences at a particular place (Station XX in this embodiment) and the other places. In this example, Station XX is only exemplary only, and at least one identifier selected from ECGI, TAI, RAI, SAL, LAI, CGI, SSID, BSSID, and HESSID may be used as actual marks for location information.

Additionally, the time of day 606 in Table allows different policies to be expressed depending on a time of day. For example, an IP flow filtered with (*, UE IP, *, *, *) may have a higher WLAN preference value of 40 at a time zone 11:00~14:00 having heavier traffic in compared with a value of 10 at the other time zone. This higher WLAN preference value may promote the use of the WLAN.

As discussed heretofore in this embodiment, the eNB may determine a WLAN preference value on the basis of at least one type of information selected from the flow type, the UE location, and the time of day.

Figure 7:
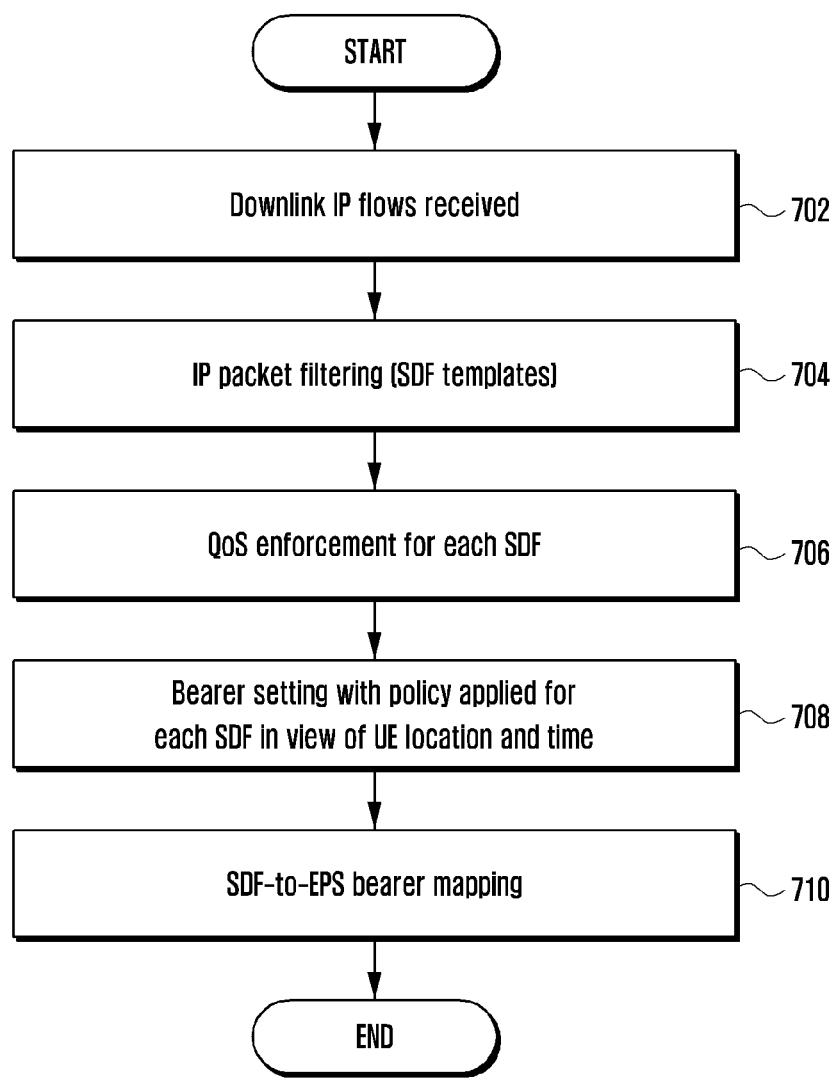
FIG. 7 is a diagram illustrating a method for setting a bearer at a gateway according to an embodiment of the present disclosure. In an embodiment, the gateway may include a PGW.

FIG. 7 is a diagram illustrating a method for setting a bearer at a gateway according to an embodiment of the present disclosure. In an embodiment, the gateway may include a PGW.

Referring to FIG. 7, at step 702, the gateway may receive one or more IP flows from a PDN.

At step 704, the gateway may apply an IP packet filtering to the received IP flow. Specifically, the gateway may perform a packet filtering by applying a service data flow (SDF) template.

At step 706, the gateway may determine and enforce QoS for each SDF to which a template is applied.

At step 708, the gateway may apply a traffic steering to each SDF. Specifically, at step 708, based on at least one of a UE location to receive the SDF, a current time, a feature of IP flow, and QoS, the gateway may determine a mapping relation between a relevant flow and a certain bearer having a particular WLAN preference. Specifically, the gateway may set a bearer such that an SDF to be steered preferentially to the WLAN among IP flows can be mapped to a bearer having a higher WLAN preference. Specifically, if necessary, the gateway may create a dedicated bearer and then map an SDF to that.

Further, the gateway may map some SDFs steered to the WLAN at similar priorities to the same bearer and then deliver it to the UE.

At step 710, the gateway may map the SDF to the EPS bearer according to the setting result determined at the above step 708.

Further, in an embodiment, the mapped bearer may include information on indicating the WLAN preference. Specifically, a WLAN preference property may be added, and this addition may be performed using an extension of a GTP-U header part.

According to an embodiment, steps 706 and 708 may be simultaneously performed.

In an embodiment, in order for the PGW to set the WLAN preference based on the UE location, the PGW should be able to know the UE location.

Figure 8:
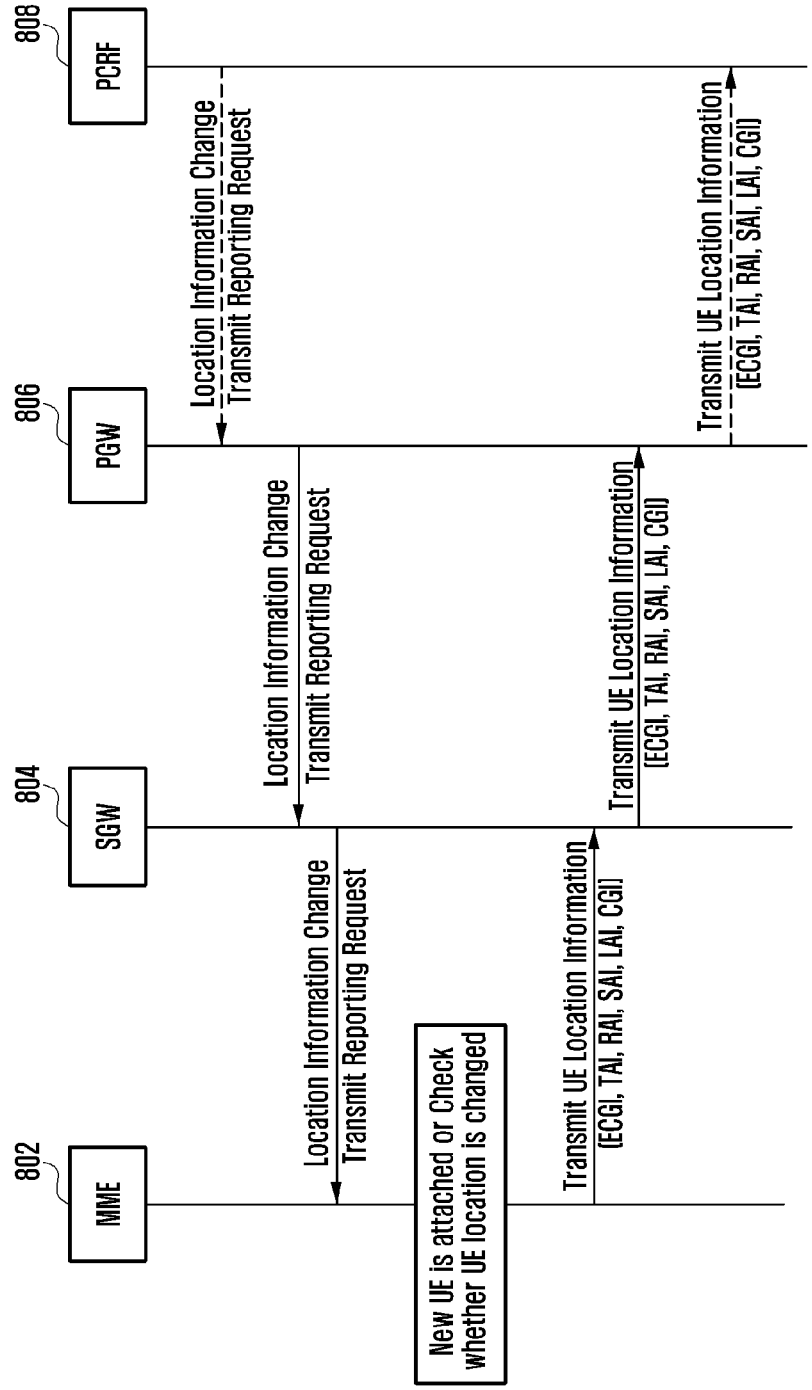
FIG. 8 illustrates a method for acquiring, at a PGW, location information about a terminal according to an embodiment.

FIG. 8 illustrates a method for acquiring, at a PGW, location information about a terminal according to an embodiment. Specifically, this embodiment shows a message flow in which the PGW receives a report on the UE location from an MME.

In an embodiment, signals may be transmitted or received among a mobility management entity (MME) 802, a serving gateway (SGW) 804, a PGW 806, and a policy and charging rules function (PCRF) 808.

At step 810, the PCRF 808 may transmit a UE information change reporting request to the PGW 806.

At step 815, the PGW 806 may deliver the received UE information change reporting request to the SGW 804.

At step 820, the SGW 804 may deliver the received UE information change reporting request to the MME 802.

At step 825, the MME 802 may check information acquired on the basis of the report received in connection with UE attach or UE location change.

At step 830, the MME 802 may deliver UE location-related information to the SGW 804. In an embodiment, the MME 802 may deliver, to the SGW 804, information including at least one of a E-UTRAN cell global identifier (ECGI), a tracking area identity (TAI), a routine area identity (RAI), a service area identity (SAI), a location area identity (LAI), and a cell global identity (CGI).

At step 835, the SGW 804 may deliver the received UE location-related information to the PGW 806. In an embodiment, the PGW 806 may check information related to the UE location and thereby, depending on the UE location information, apply different traffic setting policies. Specifically, the PGW 806 may perform mapping based on the UE location information when mapping the received IP flow to a specific bearer.

At step 840, the PGW 806 may deliver the received information to the PCRF 808.

Figure 9:
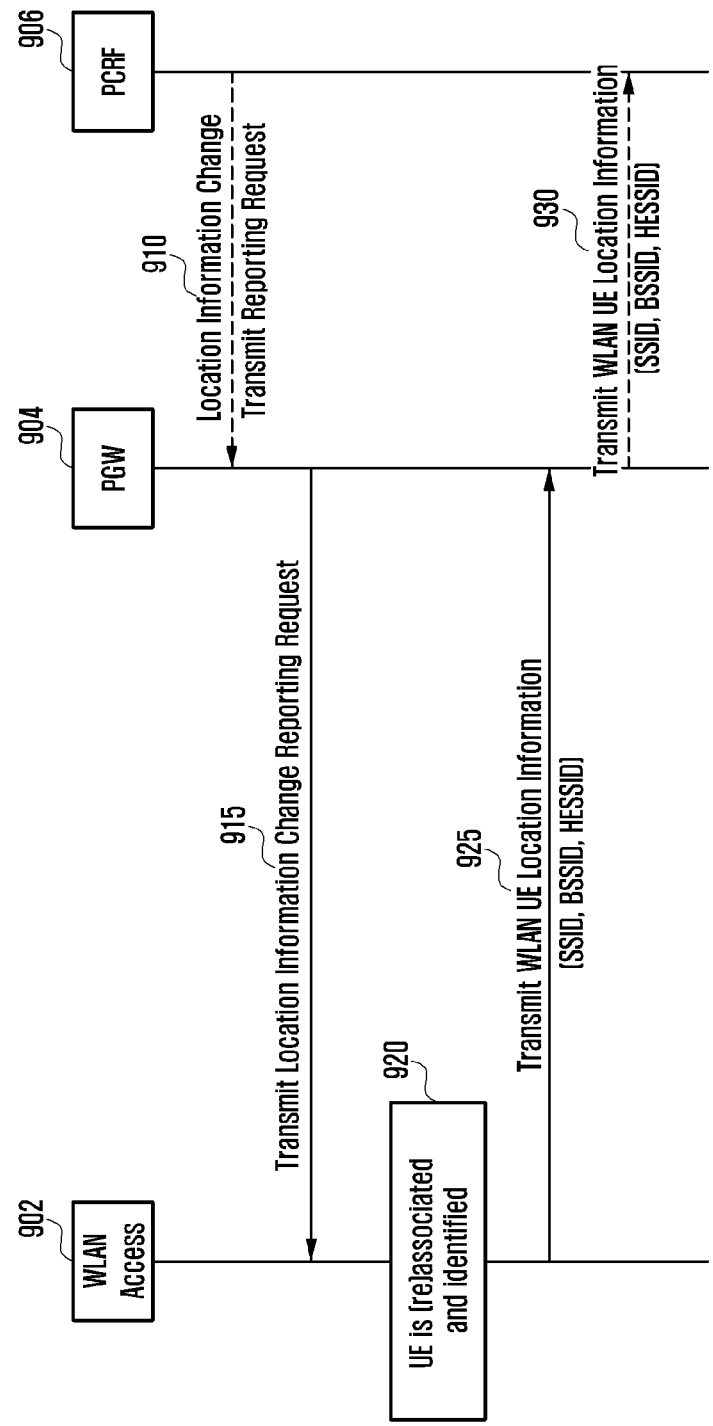
FIG. 9 illustrates another method for acquiring, at a PGW, location information about a terminal according to an embodiment.

FIG. 9 illustrates another method for acquiring, at a PGW, location information about a terminal according to an embodiment. Specifically, this embodiment shows a message flow in a process of delivering UE location information corresponding to a WLAN AP to a gateway node.

Referring to FIG. 9, signals may be transmitted or received among a WLAN 902, a PGW 904, and a PCRE 906.

At step 910, the PCRF 906 may transmit a UE information change reporting request to the PGW 904. Specifically, the PCRF 906 may have a preset function of requesting or forcing the PGW 904 to subscribe to the UE location information.

At step 915, the PGW 904 may deliver the received UE information change reporting request to the WLAN 902. Depending on embodiments, an entity to which the received UE information change reporting request is transmitted may be determined variably. For example, this request may be deliver to at least one of the SGW and the WLAN 902.

At step 920, the WLAN 902 may acquire UE information on the basis of the received UE information change reporting request. Specifically, the WLAN 902 may transmit a signal for identifying the UE location or determine the UE location on the basis of the strength of a signal received from the UE. Additionally, in case of association or re-association of UE, the WLAN 902 may identify the UE location through information such as a service set identity (SSID), a basic service set identity (BSSID), or a homogenous extended service set identifier (HESSID).

At step 925, the WLAN 902 may deliver the UE location, together with an identifier such as SSID, BSSID, or HESSID, to the PGW 904. In an embodiment, the WLAN 902 may also deliver an identifier for identifying the UE. This identifier may include a subscriber identifier.

At step 930, in case the PCRF 906 subscribes to the location information report, the PGW 904 may deliver the UE location to the PCRF 906.

As discussed heretofore, the PGW 906 may apply different traffic setting policies to traffic being transmitted on the basis of the acquired UE location information.

For allowing the UE to be offered, through the WLAN, QoS being similar in level to that offered through the cellular, the eNB and the WLAN AP are required to exchange information about which level of traffic is desired or can be delivered. For this, the eNB and the WLAN AP need a method for transmitting or receiving information. Therefore, an embodiment of this disclosure discloses a procedure in which the eNB checks, through the UE, whether the WLAN AP can accept traffic to be steered by the cellular.

Figure 10:
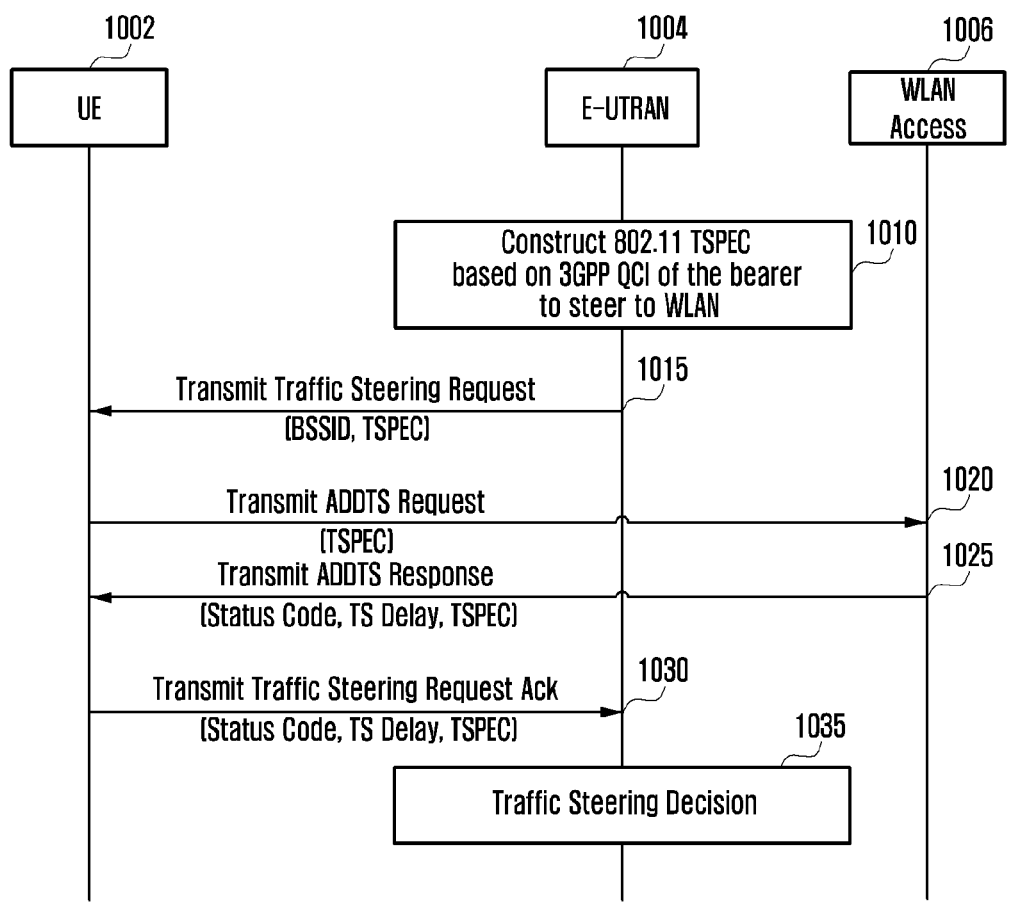
FIG. 10 illustrates a method for checking, at a base station, whether a WLAN accepts traffic.

FIG. 10 illustrates a method for checking, at a base station, whether a WLAN accepts traffic. Specifically, in this disclosed procedure, the eNB checks, via the UE, whether the WLAN can accept traffic or not. Although in this embodiment the eNB checks traffic acceptability of WLAN through the UE, it is alternatively possible to check traffic acceptability of WLAN through the network including the PGW.

Referring to FIG. 10, in an embodiment, signals may be transmitted or received among UE 1002, an eNB 1004 (denoted by E-UTRAN), and a WLAN 1006.

At step 1010, the eNB 1004 may determine, based on resource conditions of the entire access network, whether to transfer all or part of traffic being exchanged with the UE 1002 to the WLAN. Specifically, when the load of the cellular network increases, the eNB 1004 may determine to transfer part of traffic to the WLAN. In an embodiment, a basic unit of traffic transfer may be a bearer. In an embodiment, a bearer of the 3GPP cellular network has a QoS parameter (e.g., QCI) having to be satisfied. Therefore, in order to check whether the WLAL AP 1006 can accept a bearer, there is a need to check whether the WLAN AP 1006 can satisfy a QoS parameter of a bearer. For this, at step 1010, the eNB 1004 may convert a 3GPP QCI value of a bearer to be transferred to the WLAN into TSPEC (Traffic SPECification) which is a parameter defined in IEEE 802.11 WLAN standard.

At step 1015, the eNB 1004 may deliver a traffic steering request message to the UE 1002. In an embodiment, the traffic steering request message may contain BSSID of a target WLAN AP and a TSPEC value of a bearer to be transferred. Therefore, after checking whether to set a WLAN traffic stream supporting the QoS parameter with the WLAN AP 1006, the UE 1002 may report a checking result. Further, in an embodiment, information required in case of steering traffic at the SGW may be contained in the message transmitted at step 1015. Specifically, this message may contain information about a bearer or IP flow which is a target of traffic steering. Also, this message may contain a TEID of the SGW required when the WLAN AP 1006 performs uplink transmission. Based on this, the SGW may create a GTP tunnel with the WLAN for traffic steering.

At step 1020, the UE 1002 may transmit, to the WLAN 1006, a message that contains part of information received from the eNB 1004. Specifically, the UE 1002 that receives the traffic steering request message may transmit a message for creating a traffic stream with the WRAN AP 1006, based on TSPEC provided from the eNB 1004. In an embodiment, the above message for creating a traffic stream may include an ADDTS request message. Further, TSPEC contained in the ADDTS request message may have a TSPEC value of a bearer, created by the eNB 1004, to be transferred.

At step 1025, the UE 1002 may receive an ADDTS response message transmitted by the WLAN AP 1006. The ADDTS response message may contain at least one of a status code, a TS delay, and a TSPEC. In an embodiment, a status code field indicates whether traffic stream is established, and a TS delay field may contain information related to a retrial time in case of failing to create a traffic stream at this time. A TSPEC field may contain a TSPEC value of a traffic stream created actually. Additionally, in an embodiment, any information required when traffic steering is performed at the SGW may be contained in a message transmitted at the above step 1025. Specifically, this message may contain information about a bearer or IP flow which is a target of traffic steering. Also, at least one of TEID and IP address of the WLAN AP 1006 required when the WLAN AP 1006 performs downlink reception may be contained.

At step 1030, the UE 1002 may transmit a response message to the eNB, based on the above field value delivered from the WLAN AP through the ADDTS response.

At step 1035, the eNB 1004 may determine, based on the received information, whether to steer traffic. Specifically, the eNB may determine to transfer traffic when the WLAN 1006 can satisfy QoS of traffic to be transferred. If the WLAN 1006 may not satisfy QoS, the eNB may transfer other traffic capable of satisfying QoS. The order of determining traffic that satisfies QoS may be from traffic having a higher WLAN preference to traffic having a lower WLAN preference.

Although the eNB ascertains that the WLAN can accept traffic in an embodiment, the WLAN using an unlicensed band has always a possibility of QoS degradation due to external interference or the like. Therefore, in another embodiment of this disclosure, a method for returning traffic to the cellular when QoS of the WLAN is degraded will be described.

Figure 11:
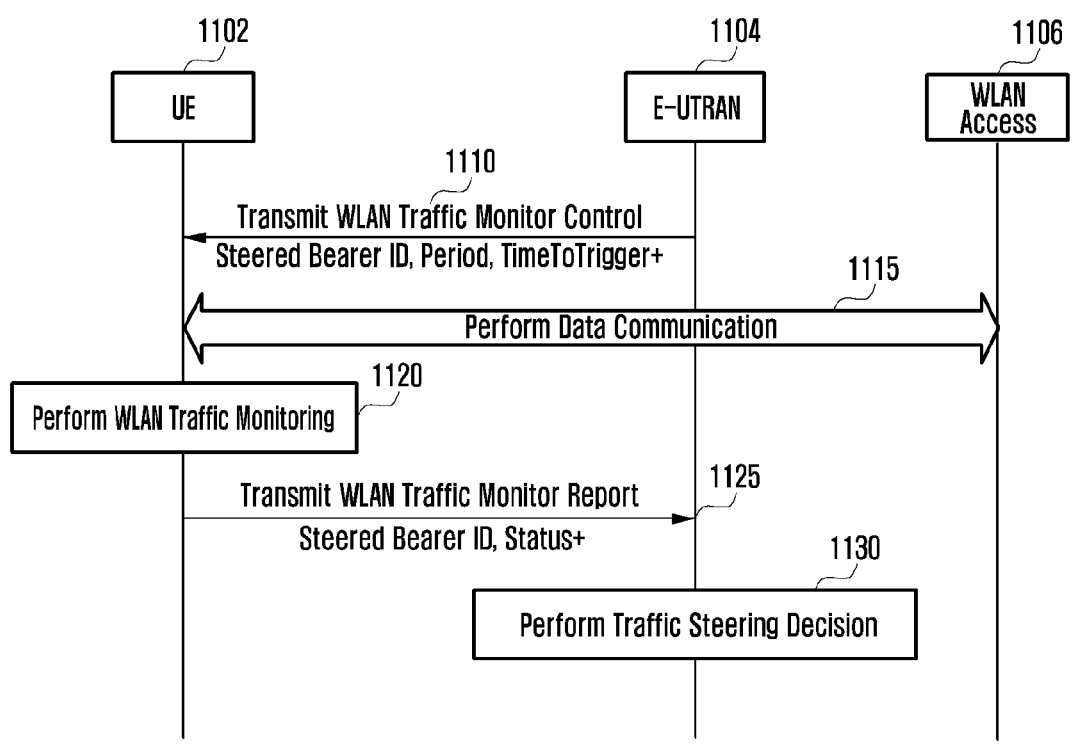
FIG. 11 illustrates a method for returning, at a base station, traffic transmitted to a WLAN to a base station according to an embodiment.

FIG. 11 illustrates a method for returning, at the base station, traffic transmitted to a WLAN to a base station according to an embodiment. Specifically, shown is a message flow of a procedure in which the eNB returns traffic, transferred to the WLAN, to the cellular.

Referring to FIG. 11, data may be transmitted or received among UE 1102, an eNB 1104 (denoted by E-UTRAN), and a WLAN 1106.

At step 1110, the eNB 1104 may transmit a WLAN traffic monitor control message to the UE 1102. Specifically, the eNB 1104 may transmit, to the UE 1102, the WLAN traffic monitor control message that instructs monitoring about traffic in order to check whether QoS of a bearer transferred to the WLAN 1106 is degraded The WLAN traffic monitor control message may contain at least one of ID of a bearer as a monitoring target, a period to receive QoS status monitoring from the UE at the eNB, a report type, and a time to trigger. According to an embodiment, the report type may be set as Event-Triggered. In this case, reporting is carried out only when an event of QoS degradation happens, thus reducing message transmission overhead for reporting. Additionally, in order to prevent a temporary QoS degradation from being reported to the eNB 1104, it may be set to report a QoS degradation to the eNB 1104 only when the QoS degradation continues more than the time to trigger.

Further, in an embodiment, since the eNB 1104 may transfer one or more bearers to the WLAN, the WLAN traffic monitor control message may contain one or more of the above parameter sets.

At step 1115, the UE 1102 may perform data communication with the WLAN AP 1106. Specifically, the UE 1102 serves, through the WLAN AP 1106, traffic of a bearer steered to the WLAN AP 1106 from the cellular eNB.

At step 1120, the UE 1102 may monitor, based on at least one of information received at step 1110, whether QoS of traffic is degraded. In order to differentially identify WLAN traffic corresponding to a bearer, the UE 1102 may manage the bearer in response to a traffic stream. A method for setting a traffic stream may correspond to that described in another embodiment.

At step 1125, the UE 1102 may transmit a monitoring report to the eNB 1104, based on the monitoring result and information received at step 1110. The monitoring report may contain at least one of a bearer ID and a bearer status.

At step 1130, the eNB may determine, based on the received monitoring report, whether to perform traffic steering. Specifically, in case QoS of a bearer transmitted by the WLAN AP is degraded, this bearer may be steered to be serviced by the eNB.

Further, in an embodiment of this disclosure, the eNB may determine to transfer a specific bearer from the cellular to the WLAN or vice versa in view of resource conditions of the radio access network. A process of resetting, at the eNB, a bearer among the UE, the access network, and the core network gateway will be described.

Figure 12:
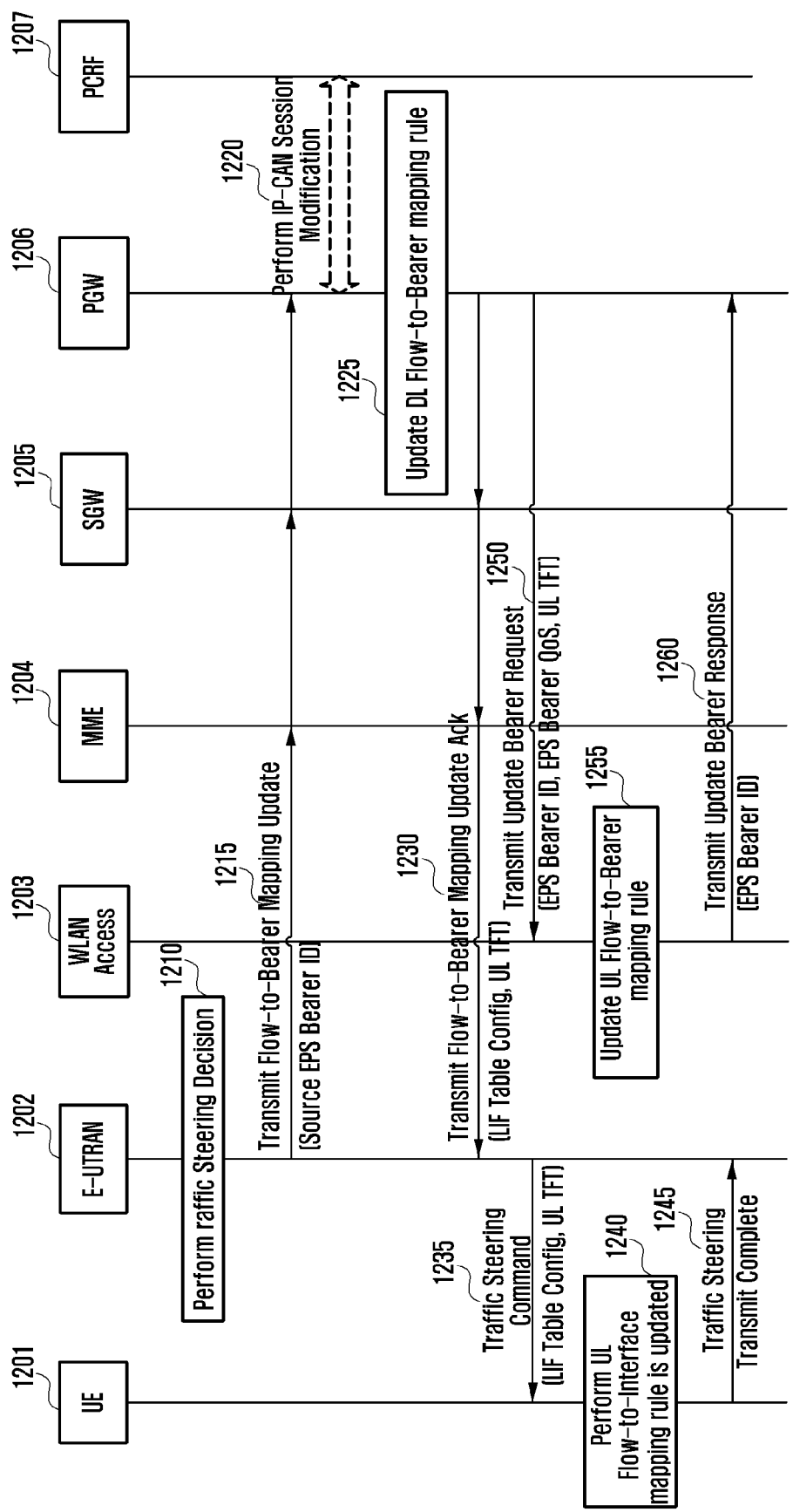
FIG. 12 illustrates a method for transferring a bearer serviced by a base station to a WLAN according to an embodiment of this disclosure.

FIG. 12 illustrates a method for transferring a bearer serviced by a base station to a WLAN according to an embodiment of this disclosure. Specifically, shown is a message flow initiated by the eNB and transferring a cellular bearer to a WLAN bearer.

Referring to FIG. 12, signals may be transmitted or received among UE 1201, eNB 1202, WLAN AP 1203, MME 1204, SGW 1205, PGW 1206, and PCRF 1207.

At step 1210, the eNB 1202 may determine to serve at least one of bearers, being serviced by the eNB 1202, through the WLAN 1203. Specifically, based on at least one of a resource condition of each access network and features of a bearer, the eNB 1202 may determine to serve, through the WLAN 1203, a bearer which is served to the UE 1201 through the cellular.

Therefore, the eNB 1202 may transmit, to the PGW 1206, a message for steering downlink traffic toward the WLAN 1203. Also, the eNB 1202 may transmit, to the UE 1202, a message for steering uplink traffic toward the WLAN 1203.

At step 1215, the eNB 1202 may deliver the message for traffic steering to the PGW 1206. Specifically, the eNB 1202 delivers a flow-to-bearer mapping update message to the PGW 1206 (through the MME 1204 and the SGW 1205). Also, if the SGW 1205 connects the eNB 1202 and the WLAN 1203, the message for traffic steering may be transmitted to the SGW 1206.

According to an embodiment, the flow-to-bearer mapping update message may contain an ID of a bearer to be transferred to the WLAN 1203 by the eNB 1202. Specifically, the ID of a bearer may be contained as a source EPS bearer ID parameter in this message. Also, this message may contain an identifier indicating the WLAN 1203 to which a bearer will be transferred and serviced. This identifier indicating the WLAN includes a BSSID.

At step 1220, in case of a network that uses PCC (Policy and Charging Control) infra, the PGW 1206 that receives the above message may deliver, to the PCRF 1207, a bearer change request serviced through the eNB 1202, based on information contained in the received message. Specifically, this bearer change request may be performed through IP-CAN session modification. Therefore, the PCRF 1207 may deliver an updated PCC decision to the PGW 1206.

At step 1225, the PGW 1206 may update a flow-bearer mapping relation such that a flow mapped to a bearer corresponding to a source EPS bearer ID may be mapped to a WLAN bearer. Therefore, the PGW 1206 may steer the downlink traffic from the cellular to the WLAN.

At step 1230, the PGW 1206 may transmit a response message to the eNB 1202 (via the SGW 1205 and the MME 1204). Specifically, the PGW 1206 may transmit, to the eNB 1202, a flow-to-bearer mapping update ack message as a response to the flow-to-bearer mapping update message received at step 1215. In an embodiment, this response message may contain at least one of LIF (Logical Interface) table config and UL TFT (Traffic Flow Template) to be delivered again to the UE 1201 by the eNB 1202. Further, in case of a network using PCC infra, the LIF table config and the UL TFT may be values received by the PGW 1206 while a PCC decision of the PCRF 1207 is delivered.

At step 1235, the eNB 1202 may transmit a message to the UE 1201 such that uplink traffic can be steered to the WLAN. Specifically, the eNB 1202 transmits a traffic steering command message comprising the LIF table config and the UL TFT to the UE 1201 such that uplink traffic can be steered from the cellular to the WLAN. A detailed process in which traffic in a bearer is steered from the cellular to the WLAN through the LIF table config and the UL TFT will be described below.

At step 1240, based on the received message, the UE 1201 may perform traffic steering to transmit specific traffic to the WLAN interface. Specifically, the UE 1201 may update a logical interface table and UL TFT, based on the LIF table config and the UL TFT in the traffic steering command message received from the eNB 1202. Therefore, the UE 1201 may transmit, to the WLAN interface, traffic desired to steer from the cellular to the WLAN by the eNB 1202.

At step 1245, the UE 1201 may transmit, to the eNB 1202, a message for notifying that traffic steering is completed.

In an embodiment, traffic of a cellular bearer sent to the WLAN 1203 may be transmitted between the UE 1201 and the WLAN access through WLAN connectivity. There is a need to set which bearer will deliver traffic in a section between the WLAN access 1203 and the PGW 1206.

At step 1250, the PGW 1206 may deliver an update bearer request message for a bearer update to the WLAN access 1203. In an embodiment, the update bearer request message may contain at least one of an EPS bearer ID and EPS bearer QoS information required for a bearer update. Also, the update bearer request message may contain UL TFT information required for mapping traffic, delivered through WLAN connectivity, to a specific bearer at the WLAN access 1203.

At step 1255, the WLAN 1203 may map an uplink flow to a specific bearer, based on the received message.

At step 1260, the WLAN 1203 may transmit a response message to the PGW 1206. This response message may contain an update bearer response, which may contain an updated EPS bearer ID.

In an embodiment, steps 1235 to 1245 and steps 1250 to 1260 may be performed regardless of the order of operation and may be performed simultaneously.

Figure 13:
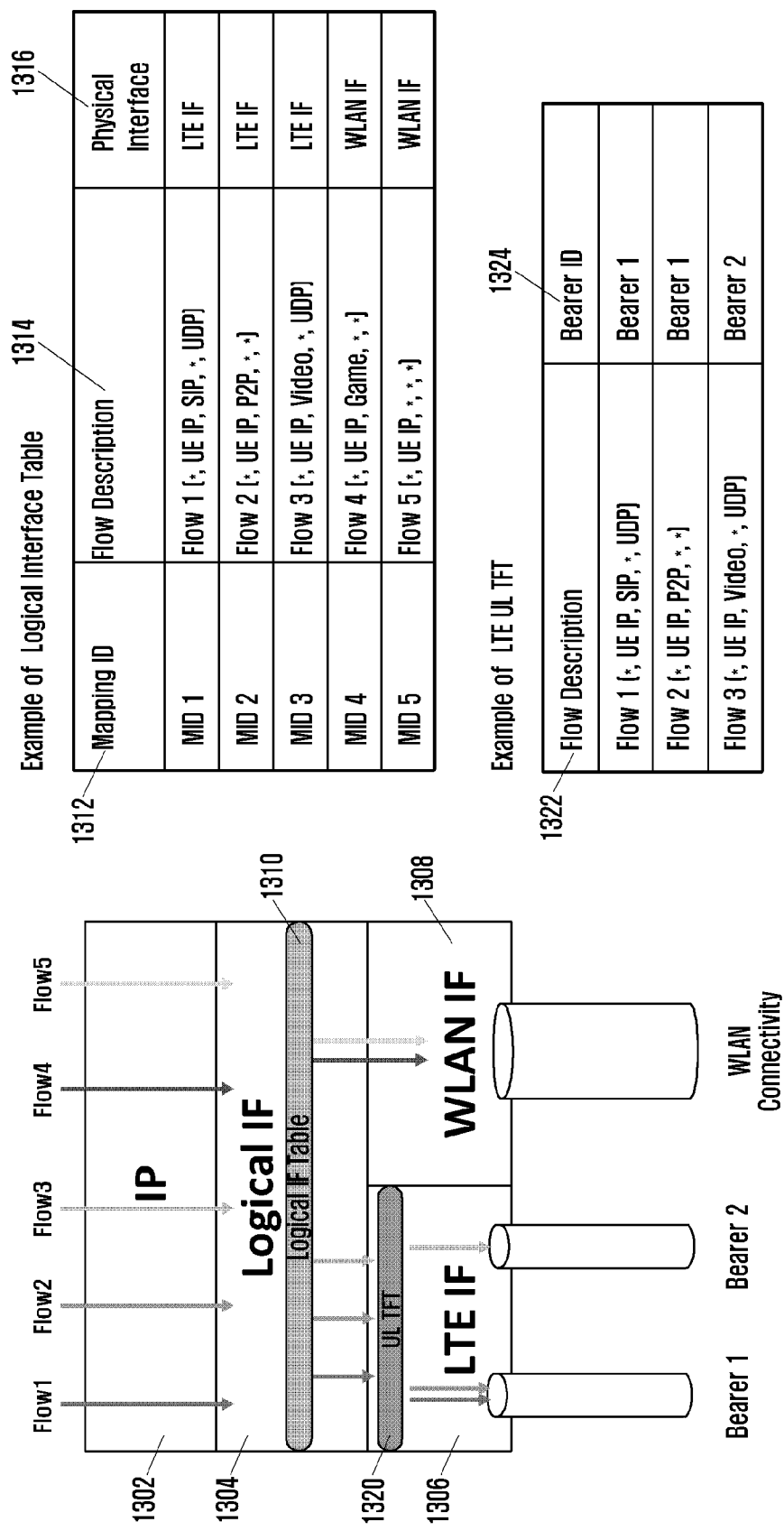
FIG. 13 illustrates a method for steering traffic at a terminal according to an embodiment.

FIG. 13 illustrates a method for steering traffic at a terminal according to an embodiment. Specifically, shown are configuration examples of a protocol stack including a logical interface in UE, a logical IF table, and a UL TFT.

Referring to FIG. 13, an upper layer above an IP layer creates five IP flows including Flow to Flow 5. Also, the IP layer 1302 may transmit downwards these five IP flows to a logical interface 1304.

In an embodiment, the logical interface 1304 may process the IP flows, based on the logical interface table. The logical interface table contains a mapping ID 1312 for each flow and may have a flow description 1314 formed of 5-Tuple (a source IP address, a destination IP address, a source port number, a destination port number, and a protocol identifier) in a similar manner to a filter rule in FIG. 6. Also, based on the flow description 1314, a physical interface 1316 may be determined.

Further, the logical interface table has a function to deliver traffic mapped to the flow description 1314 to the corresponding physical interface 1316. In an embodiment, the physical interface 1316 may include an LTE interface 1306 and a WLAN interface 1308. For example, in the configuration example of the logical interface table, the first row indicates that an IP flow corresponding to (*, UE IP, SIP, *, UDP) is sent to the LTE interface. This flow sent to the LTE interface undergoes again filtering of the UL TFT 1320 within the LTE interface. In an embodiment, the configuration of the UL TFT 1320 may include a flow description 1322 and a corresponding bearer ID 1324. According to the configuration example of the UL TFT 1320, the above flow corresponding to (*, UE IP, SIP, *, UDP) will be mapped to Bearer 1 and delivered to the eNB.

The logical interface table and the LTE UL TFT may be determined depending on a preset value or on the basis of a signal received from the eNB.

Further, according to an embodiment, the LTE interface 1306 and the WLAN interface 1308 may be implemented in the same chip. In this case, the LTE interface 1306 and the WLAN interface 1308 may be located below the IP layer 1302 without the logical interface 1304, and also the UL TFT 1320 may filter the entire information transmitted or received between the LTE interface 1306 and the WLAN interface 1308. Through this, a WLAN steering may be performed much more smoothly.

Figure 14:
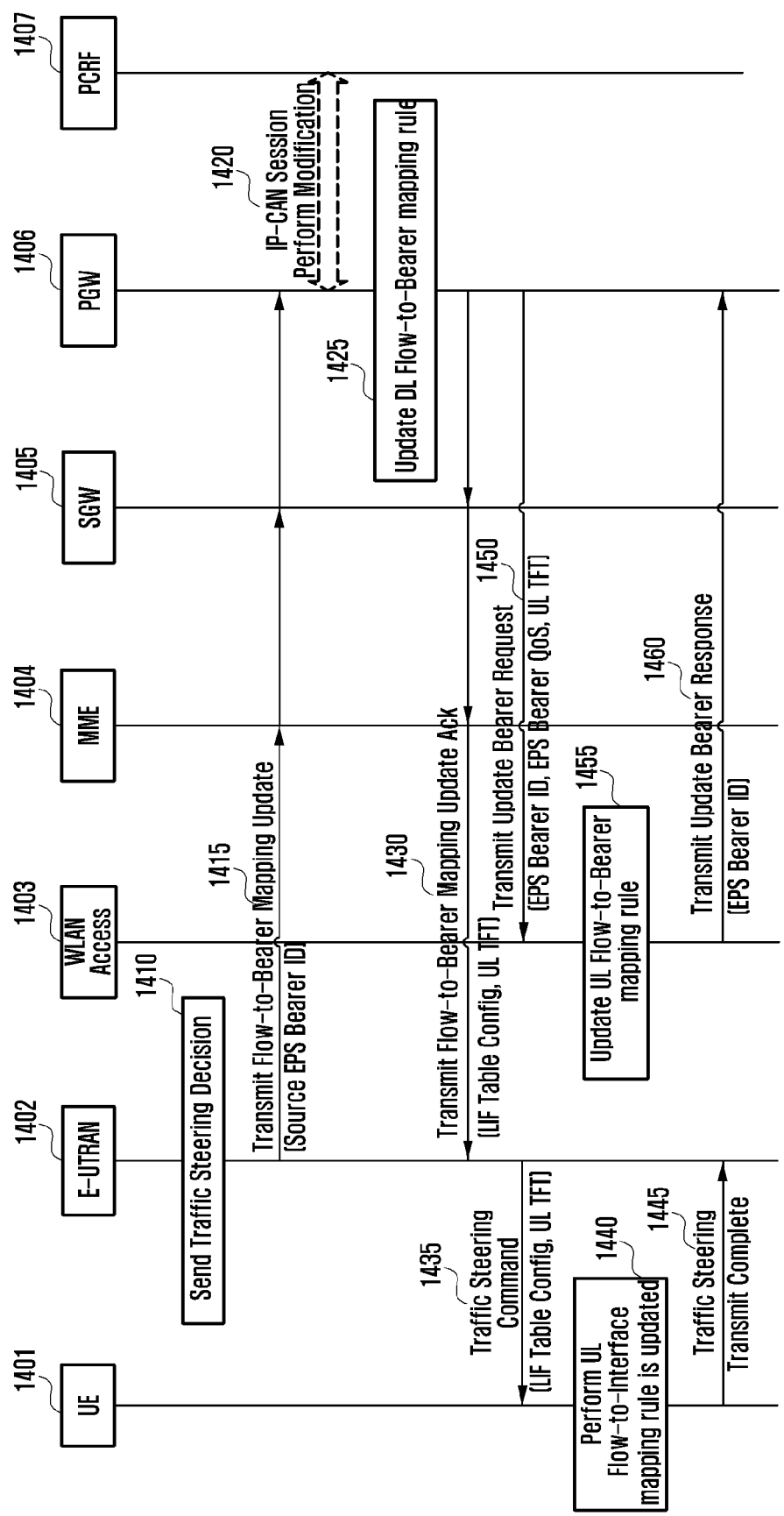
FIG. 14 illustrates a method for transferring a bearer serviced by a WLAN to a base station according to an embodiment of this disclosure.

FIG. 14 illustrates a method for transferring a bearer serviced by a WLAN to a base station according to an embodiment of this disclosure. Specifically, the flow of message transferring a bearer via WLAN to a base station in order to pass through a cellular network is shown.

Referring to FIG. 14, signals may be transmitted or received among UE 1401, eNB 1402, WLAN AP 1403, MME 1404, SGW 1405, PGW 1406, and PCRF 1407.

At step 1410, the eNB 1402 may determine to service, through the eNB 1402, at least one of bearers serviced the by WLAN 1403. Specifically, based on at least one of a resource condition of each access network and a feature of a serviced bearer, or based on a QoS monitoring result of a bearer transferred to the WLAN, the eNB 1402 may determine to service, through the cellular again, the bearer steered to the WLAN.

Therefore, the eNB 1402 may transmit, to the PGW 1406, a message for steering downlink traffic of the bearer toward the eNB 1402. Also, the eNB 1402 may transmit, to the UE 1401, a message for instructing to transmit uplink traffic toward the eNB 1402.

At step 1415, the eNB 1402 may deliver a message for traffic steering to the PGW 1406. Specifically, the eNB 1402 delivers a flow-to-bearer mapping update message to the PGW 1405 (via the MME 1404 and the SGW 1405).

According to an embodiment, the flow-to-bearer mapping update message may contain an ID of a bearer to be transferred to the cellular network by the eNB 1202. Specifically, the ID of a bearer may be contained as a source EPS bearer ID parameter in this message. Specifically, according an embodiment, the ID of the bearer may include the ID of an original bearer, which is set primarily to go via the cellular network and steered to go via the WLAN by the decision of the eNB, not the ID of a bearer which is set currently to go via the WLAN.

At step 1420, in case of a network that uses PCC (Policy and Charging Control) infra, the PGW 1406 that receives the above message may deliver, to the PCRF 1407, a bearer change request of the eNB 1402. Then the PCRF 1407 may deliver an updated PCC decision to the PGW 1406.

At step 1425, the PGW 1406 may update a flow-bearer mapping relation such that a flow indicated by a source EPS bearer ID may be mapped to a cellular bearer. In an embodiment, if a bearer having the source EPS bearer ID is released, the PGW 1406 may reset the released bearer. Therefore, downlink traffic may be steered from the WLAN 1403 to the cellular network of the eNB 1402.

At step 1430, the PGW transmits a flow-to-bearer mapping update ack message as a report about the flow-to-bearer mapping update message to the eNB (via the SGW 1405 and the MME 1404). This message may contain, as parameters, LIF (Logical Interface) table config and UL TFT to be delivered again to the UE by the eNB. In case of a network using PCC infra, the LIF table config and the UL TFT may be values received while a PCC decision of the PCRF is delivered.

At step 1435, the eNB 1402 may transmit a message to the UE 1401 such that uplink traffic can be steered from the WLAN 1403 to the cellular network of the eNB 1402. Specifically, the eNB 1402 may transmit a traffic steering command message comprising the LIF table config and the UL TFT to the UE 1401 and thereby instruct to steer uplink traffic from the WLAN to the cellular network of the eNB 1402.

At step 1440, the UE 1401 that receives the LIF table config and the UL TFT in the traffic steering command message may update the received information in a logical interface table and UL TFT. Therefore, traffic desired by the eNB 1402 to steer from the WLAN 1403 to the cellular network of the eNB 1402 may be transmitted toward the cellular interface and mapped to a bearer by UL TFT within the cellular interface of the eNB 1402.

Meanwhile, in an embodiment, although a rule regarding the steered traffic of UL TFT which is set to the WLAN access 1403 is not needed any more, there is a need to synchronize and maintain the content of UL TFT in the PGW 1406 and the WLAN access 1403. Also, there may be a need to change setting of a bearer since traffic delivered between the WLAN 1403 and the PGW 1406 is decreased.

Therefore, at step 1450, the PGW 1406 may deliver an update bearer request message to the WLAN access 1403. This message may contain an EPS bearer ID and EPS bearer QoS information required for a bearer update. Also, information on updating UL TFT which is set to the WLAN access may be contained.

At step 1455, the WLAN 1403 may update a bearer, based on the received information.

At step 1460, the WLAN 1403 may transmit a response message to the PGW 1406. In an embodiment, this response message may contain a bearer ID. In an embodiment, in case of determining to service, through the eNB 1402, one or more of a plurality of bearers serviced by the WLAN 1403, one or more of such bearers may be selected to be serviced through the eNB 1402, based on a WLAN preference value. Specifically, it is determined to service a bearer having a low WLAN preference value through the eNB 1402.

Figure 15:
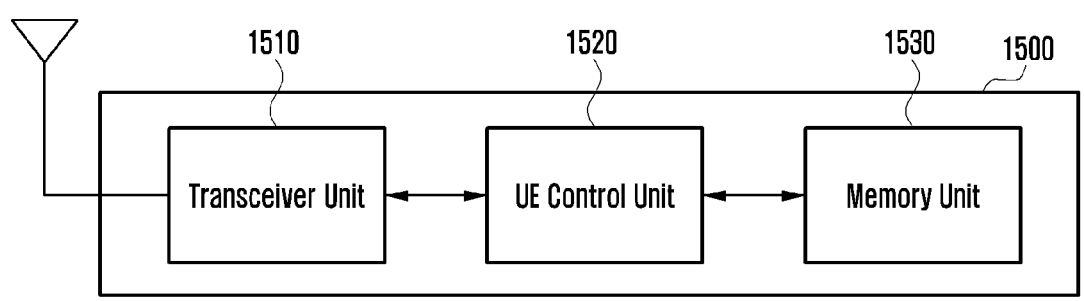
FIG. 15 is a diagram illustrating a terminal according to an embodiment.

FIG. 15 is a diagram illustrating a terminal according to an embodiment.

Referring to FIG. 15, UE in an embodiment may include a transceiver unit 1510 capable of transmitting or receiving a signal to or from at least one of eNB and WLAN.

Also, a UE control unit 1520 controls the transceiver unit 1510 to transmit or receive a signal and may process the signal and control the whole operation of the UE 1500. Specifically, the UE control unit 1520 in an embodiment may perform association or re-association with the WLAN. Also, the UE control unit may transmit information related to the UE location to the eNB or perform attach. Also, the UE control unit may determine the status of the WLAN, based on information received from the eNB, and deliver it to the eNB. Also, the UE control unit may monitor QoS of traffic serviced by the WLAN and then deliver it to the eNB. Also, the UE control unit may steer traffic serviced by the eNB or the WLAN to the WLAN or the eNB in response to instructions of the eNB. Also, the UE control unit may map each IP flow to the cellular IF or the WLAN IF according to specific setting. Additionally, the UE control unit 1520 may control the overall operations of the UE disclosed in embodiments of this disclosure.

Further, the UE 1500 may include a memory unit 1530 for storing a signal transmitted or received via the transceiver unit 1510 and/or information related to a signal processed by the control unit 1520.

Figure 16:
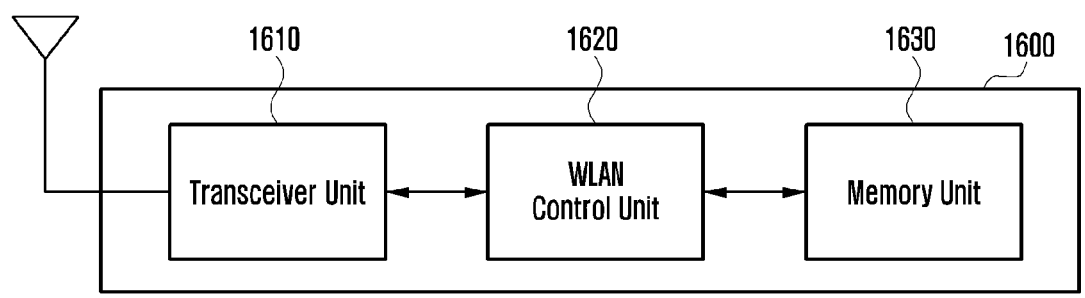
FIG. 16 is a diagram illustrating a WLAN according to an embodiment.

FIG. 16 is a diagram illustrating a WLAN according to an embodiment.

Referring to FIG. 16, the WLAN 1600 in an embodiment may include a transceiver unit 1610 capable of transmitting or receiving a signal to or from at least one of UE and PGW.

Also, a WLAN control unit 1620 controls the transceiver unit 1610 to transmit or receive a signal and may process the signal and control the whole operation of the WLAN 1600. Specifically, the WLAN control unit 1620 in an embodiment may perform association or re-association with the UE. Also, the WLAN control unit may receive, from the PGW or the UE, a traffic steering signal triggered by the eNB and then perform a related operation. Also, the WLAN control unit may deliver a traffic state of the WLAN to the UE. Also, the WLAN control unit may deliver, to the UE, information related to QoS of traffic serviced by the WLAN. Additionally, the WLAN control unit 1620 may control the overall operations of the UE disclosed in embodiments of this disclosure.

Further, the WLAN 1600 may include a memory unit 1630 for storing a signal transmitted or received through the transceiver unit 1610 and/or information related to a signal processed by the control unit 1620.

Figure 17:
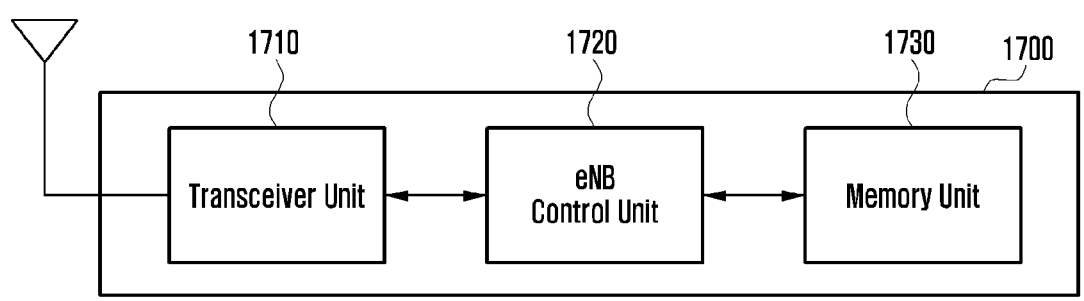
FIG. 17 is a diagram illustrating a base station according to an embodiment.

FIG. 17 is a diagram illustrating a base station according to an embodiment.

Referring to FIG. 17, eNB 1700 in an embodiment may include a transceiver unit 1710 capable of transmitting or receiving a signal to or from at least one of UE and a network node. In an embodiment, the network node may include MME, SGW and PGW.

Also, an eNB control unit 1720 controls the transceiver unit 1710 to transmit or receive a signal and may process the signal and control the whole operation of the eNB 1700. Specifically, the eNB control unit 1720 in an embodiment may determine whether to steer traffic, based on communication conditions and WLAN preference information of a bearer received from the PGW. In case traffic steering is determined, the eNB control unit may deliver a message for traffic steering to the UE and the PGW. Also, the eNB control unit may deliver a signal for monitoring a WLAN status and a status of a bearer transmitted by the WLAN. Additionally, the eNB control unit 1720 may control the overall operations of the UE disclosed in embodiments of this disclosure.

Further, the eNB 1700 may include a memory unit 1730 for storing a signal transmitted or received through the transceiver unit 1710 and/or information related to a signal processed by the control unit 1720.

Figure 18:
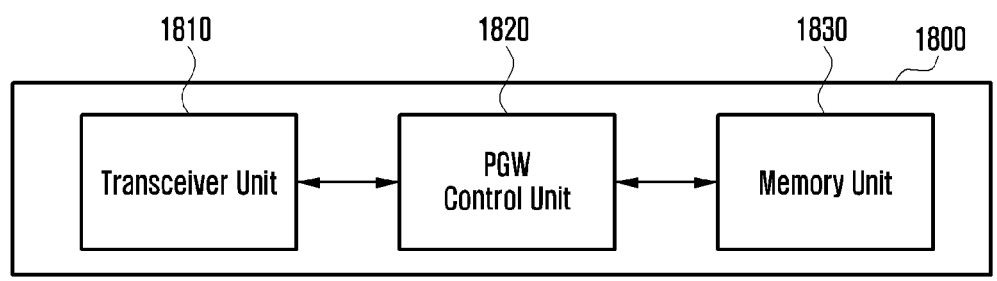
FIG. 18 is a diagram illustrating a PGW according to an embodiment.

FIG. 18 is a diagram illustrating a PGW according to an embodiment.

Referring to FIG. 18, PGW 1800 in an embodiment may include a transceiver unit 1810 capable of transmitting or receiving a signal to or from a network node. In an embodiment, the network node may include eNB, MME, SGW, PGW, and PCRF.

Also, a PGW control unit 1820 controls the transceiver unit 1810 to transmit or receive a signal and may process the signal and control the whole operation of the PGW 1800. Specifically, the PGW control unit 1820 in an embodiment may perform steering of downlink data, based on a signal received from the eNB. Specifically, based on information received from the eNB, the PGW control unit may steer traffic, being transmitted through the eNB, to the WLAN, or traffic, being transmitted through the WLAN, to the eNB. Also, the PGW control unit may classify received flows, based on their features, and map each flow to a specific bearer. Also, the PGW control unit may allow a WLAN preference for determining steering according to features of IP flow including a bearer. Additionally, the PGW control unit 1820 may control the overall operations of the UE disclosed in embodiments of this disclosure.

Further, the PGW 1800 may include a memory unit 1830 for storing a signal transmitted or received through the transceiver unit 1810 and/or information related to a signal processed by the control unit 1820.

While this invention has been particularly shown and described with reference to an exemplary embodiment thereof, it will be understood by those skilled in the art that various changes in form and details may be made therein without departing from the spirit and scope of this invention as defined by the appended claims.

What is claimed is:

1. A method of transmitting a signal by a terminal in a wireless communication system, the method comprising:
    identifying a mapping identifier (ID) for a packet flow;
    mapping the packet flow to a physical interface based on the mapping ID, wherein the physical interface includes a long term evolution (LTE) interface and a wireless local access network (WLAN) interface;
    mapping the packet flow to a data radio bearer (DRB) based on a flow description corresponding to the mapping ID, in case that a physical layer to be mapped with the packet flow is the LTE interface, by a layer between the packet flow and a packet data convergence protocol (PDCP) layer of the terminal; and
    transmitting, to a base station, the packet flow on the DRB,
    wherein the DRB is determined based on a mapping rule between the packet flow and the DRB, in case that the mapping rule is received from the base station, and
    wherein the DRB is determined as a default DRB, in case that the mapping rule between the packet flow and the DRB is not received from the base station.

2. The method of claim 1, wherein the mapping rule configures at least one identifiers of a packet flow which is mapped to the DRB.

3. A terminal of transmitting a signal in a wireless communication system, the terminal comprising:
    a transceiver configured to transmit and receive a signal; and
    a controller configured to:
        identify a mapping identifier (ID) for a packet flow,
        map the packet flow to a physical interface based on the mapping ID, wherein the physical interface includes a long term evolution (LTE) interface and a wireless local access network (WLAN) interface,
        map the packet flow to a data radio bearer (DRB) based on a flow description corresponding to the mapping ID, in case that a physical layer to be mapped with the packet flow is the LTE interface, by a layer between the packet flow and a packet data convergence protocol (PDCP) layer of the terminal, and
        control the transceiver to transmit, to a base station, the packet flow on the DRB,
    wherein the DRB is determined based on a mapping rule between the packet flow and the DRB, in case that the mapping rule is received from the base station, and
    wherein the DRB is determined as a default DRB, in case that the mapping rule between the packet flow and the DRB is not received from the base station.

4. The terminal of claim 3, wherein the mapping rule configures at least one identifiers of a packet flow which is mapped to the DRB.

* * * * *